United States Patent [19]

Mattson

[11] 4,026,578

[45] May 31, 1977

[54] VEHICULAR WHEEL ADJUSTING DEVICE

[76] Inventor: Charles T. Mattson, 5184 Sonoma Highway, Santa Rosa, Calif. 95405

[22] Filed: Apr. 7, 1976

[21] Appl. No.: 674,564

[52] U.S. Cl. .............................. 280/661; 280/95 R; 280/668

[51] Int. Cl.² ........................................ B62D 17/00

[58] Field of Search ................. 280/661, 668, 95 R

[56] References Cited

UNITED STATES PATENTS

| 2,405,458 | 8/1946 | Slack | 280/661 |
|---|---|---|---|
| 2,923,555 | 2/1960 | Kost | 280/661 X |
| 3,589,701 | 6/1971 | Gee | 280/668 X |
| 3,880,444 | 4/1975 | Bridges | 280/661 |
| 3,887,211 | 6/1975 | Mazur | 280/95 R |

FOREIGN PATENTS OR APPLICATIONS

| 2,327,609 | 12/1974 | Germany | 280/661 |

Primary Examiner—John P. Silverstrim
Attorney, Agent, or Firm—Melvin R. Stidham

[57] ABSTRACT

A device for adjusting the front wheel alignment of an automotive vehicle including a McPherson-type strut, the upper end of which is carried on the vehicle frame for limited pivotal movement and the lower end of which carries the wheel spindle assembly. The lower end of the strut is fixed on a steering arm which is pivoted on the lower ball joint. A cylindrical mounting member on which the lower ball joint stud is eccentrically secured may be rotated on the steering arm to vary the position of the strut axis relative to the fixed lower ball joint axis, pivoting the strut about its upper end mounting to adjust the camber and caster of the wheel. After the adjustment is made, the bolts attaching the steering arm to the strut are tightened to clamp the cylindrical mounting member in place.

3 Claims, 4 Drawing Figures

VEHICULAR WHEEL ADJUSTING DEVICE

BACKGROUND OF THE INVENTION

In many automobiles, particularly of foreign manufacture, including a McPherson-type strut, there are no means for adjusting wheel alignment. The position of the axis of the strut is fixed whereby it is impossible to adjust either wheel camber or caster, and the owner has to rely solely upon achievement of manufacturing tolerances for perfect alignment.

OBJECTS OF THE INVENTION

It is an object of this invention to provide means for adjusting the camber of a vehicle wheel carried on a McPherson-type strut.

It is a further object of this invention to provide means for adjusting the caster of a wheel carried on a McPherson-type strut.

It is a further object of this invention to provide means for modifying a conventional McPherson-type strut to enable accurate adjustment of front wheel alignment.

Other objects and advantages of this invention will become apparent from the description to follow, particularly when read in conjunction with the accompanying drawings.

BRIEF SUMMARY OF THIS INVENTION

In carrying out this invention, I have modified the steering arm which is conventionally bolted to the lower end of a McPherson-type strut, and on which is secured the stud of the lower ball joint socket at the end of the lower control arm of a vehicle. Specifically, I have provided for a circular bearing opening in the steering arm coaxial with the strut cylinder. Rotatable in such opening is a cylindrical adjustment mounting through which the lower ball joint stud is secured eccentrically, with its axis parallel to the axis of the strut. When the bolts securing the steering arm to the lower end of the McPherson-type strut are loosened, the cylindrical mounting member may be rotated in its bearing opening whereby the axis of the strut is shifted about the fixed axis of the lower ball joint along two horizontal axes, i.e. laterally and fore and aft. This adjustment of the cylindrical mounting member pivots the strut about its upper end mounting, thereby varying its angular disposition with respect to the vertical axis of the vehicle in both horizontal axes and, therefore, varying both the camber and the caster of the front wheel mounting, When the adjustment is completed, the bolts securing the steering arm to the strut are again tightened, whereby a flange around the top of the cylindrical mounting member is clamped between the steering arm and the lower end of the strut.

DESCRIPTION OF A PREFERRED EMBODIMENT

Figure 1:
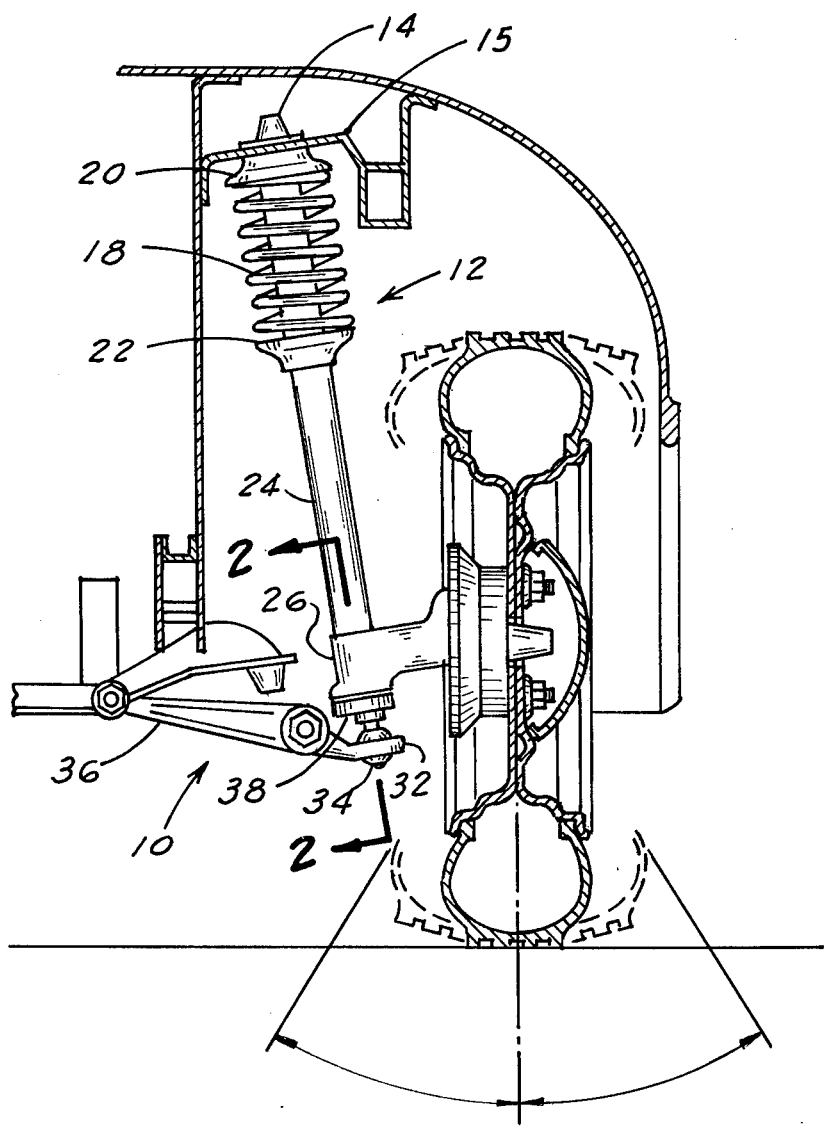
FIG. 1 is a view, partially in section, of a vehicle front wheel mounting.

Referring now to FIG. 1 with greater particularity, there is illustrated a conventional front wheel mounting 10 including a McPherson-type strut 12. The piston rod upper end 14 of the strut is mounted on a vehicle frame 15 for limited pivotal movement and a coil spring 18 is compressed between upper and lower spring seats 20 and 22 on the piston rod 14 and strut tube 24, respectively. Carried adjacent the lower end of the strut tube 24 is the steering knuckle 26 with spindle assembly 28 thereon on which is mounted the vehicle wheel 30.

The socket 32 of the lower ball joint 34 is carried on the lower control arm whereby the steering arm 38 on which the ball joint is carried may be pivoted to turn the strut tube 24 and, hence, the wheel 30. In the conventional McPherson-type strut, the axis of the lower ball joint is fixed on the axis of the strut tube 24.

Figure 2:
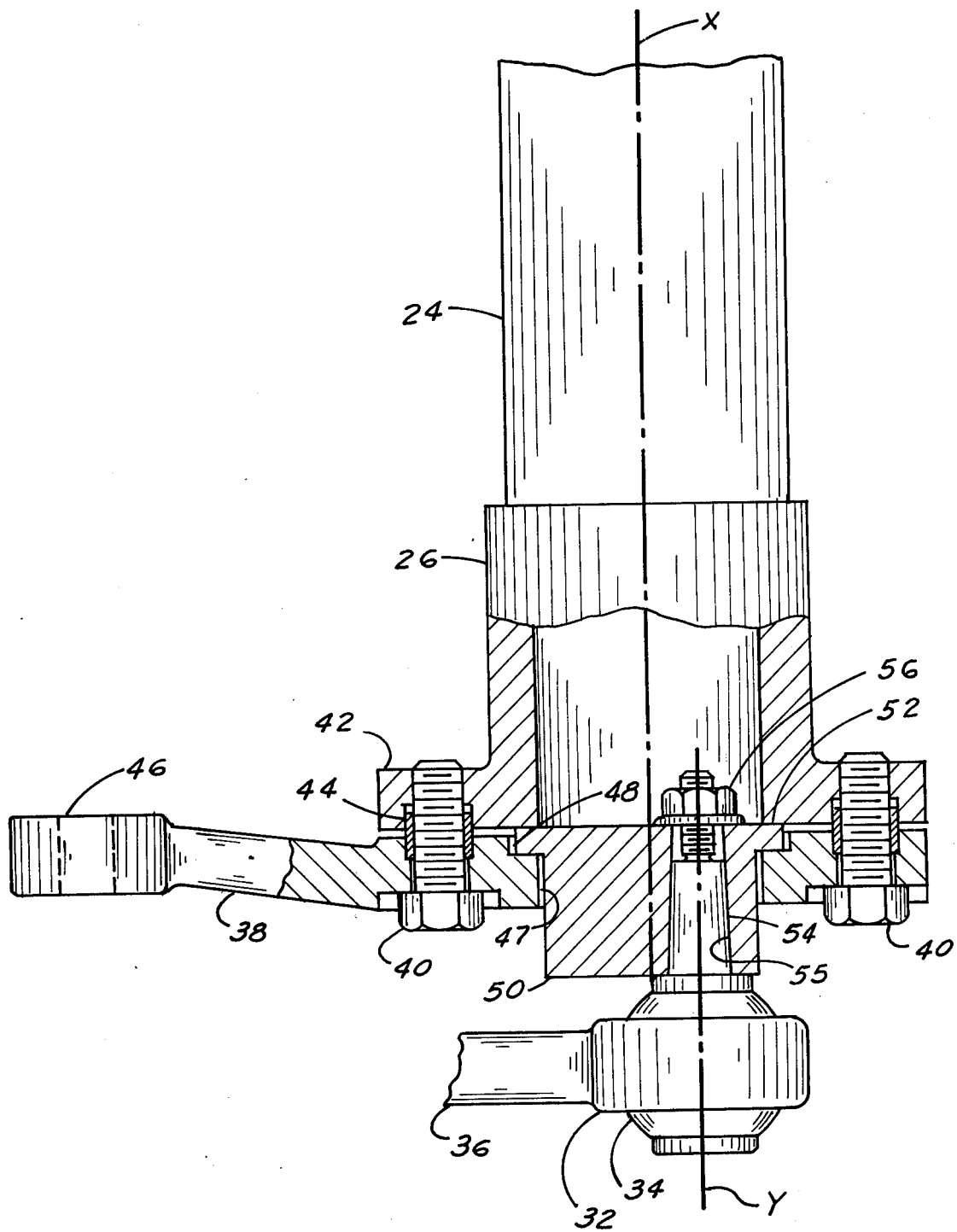
FIG. 2 is an enlarged view, partially in section, of the lower portion of the strut and the steering arm, embodying features of this invention.

Referring now to FIG. 2, there is shown an enlarged partial view of the steering arm 38, which is secured by cap screws 40 or the like to the bottom flange 42 of the strut tube 24, with the steering knuckle 26 carried thereon. Sleeves 44 are provided to extend between the steering 38 and the strut tube flange 42. The trailing end of the steering arm is adapted to be connected at 46 to the vehicle steering linkage (not shown), whereby pivotal movement of the steering arm 38 about the lower ball joint 32, 34 will be transmitted to the strut tube 24 to turn it through a partial rotation about its own axis $x$.

Instead of the conventional one-piece steering arm normally provided with a McPherson-type strut 12, the steering arm 38 is bored at 47 and counter-bored at 48 to receive a cylindrical mounting member 50, with a flange 52 around the upper end thereof seated in the counter-bore 48. The tapered stud 54 of the lower ball joint 34 is received in an eccentrically disposed, complementary tapered opening 55, and drawn to a firm, fixed position by tightening a nut 56 on the upper threaded end 58. The axis $y$ of the ball joint stud is displaced from axis $x$ on which both the cylinder mount 50 and the strut tube 24 are disposed.

Figure 3:
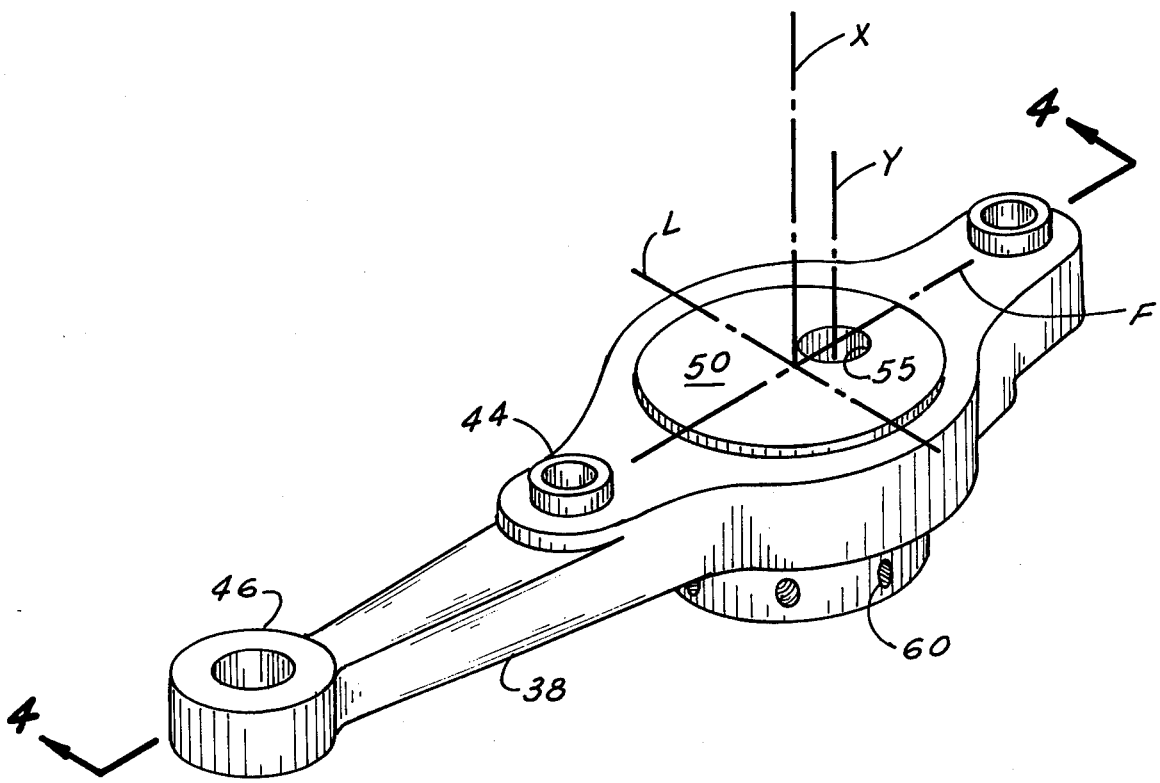
FIG. 3 is a view in perspective of the steering arm of this invention.
Figure 4:
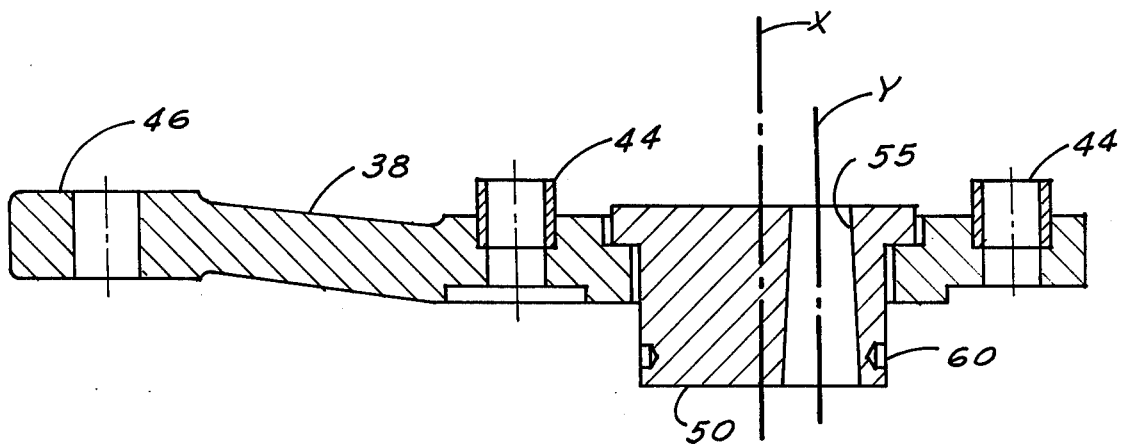
FIG. 4 is a section view taken along line 4—4 of FIG. 3.

In assembling the structure and adjusting the front wheel alignment, the lower ball joint 34 is firmly bolted into place on the adjustable mount 50 and socketed at 32. The studs 40 are threadedly engaged with the strut tube flange 42, but are not tightened. Then, by inserting a spanner wrench (not shown) in the openings 60, which are provided around the cylindrical adjustment mounting 50 (FIG. 3) the mounting may be turned to that angular disposition which provides the necessary adjustment along the lateral axis $l$ and the fore and aft axis $f$ of the vehicle. It should be noted that the fore and aft axis $f$ illustrated in FIG. 3 appears to coincide with the longitudinal axis of the steering arm. However, this is merely for purposes of illustration and the two need not be coextensive. In any event, rotation of the cylindrical adjustment member 50 will produce a shifting of the strut tube axis $x$ relative to the ball joint axis $y$, which is held stationary on the vehicle frame 15 by reason of its engagement in the socket 32 on the lower control arm 36. This pivots the strut 12 about its upper mounting 14, both laterally and fore and aft for adjustment of the camber and caster, respectively, of the front wheel. After the desired adjustment is completed, the cap screws 40 may be tightened, whereby the adjustment member flange 52 is clamped securely between the lower flange 42 of the strut tube 24 and the bottom of the counter bore 48 to fix the camber and caster for the straight ahead driving disposition. Of course, when the steering arm is pivoted by the steering linkage (not shown) while driving, variations in the displacement of the axes $x$ and $y$ will occur, but this is acceptable.

While this invention has been described in conjunction with a preferred embodiment thereof, it is obvious that modifications and changes therein may be made by those skilled in the art without departing from the spirit and scope of this invention as defined by the claims appended hereto.

What is claimed as invention is:

1. A device for adjusting the alignment of a wheel carried on a vehicle including a frame, a strut, means mounting the upper end of said strut on said frame, means mounting said wheel on the lower end of said strut, a lower ball joint having upper and lower complementary components, means for mounting said lower complementary component on said frame, and means for initiating selective steering of said wheel, said device comprising: a steering arm; means adapted to connect on end of said steering arm to said selective steering initiating means; a circular bearing opening in the other end of said steering arm; means forming an internal abutment in said bearing opening; a circular mounting member received in said bearing opening for rotation about an axis, portions of said mounting member engaging said internal abutment; means for mounting said upper complementary component on said mounting member eccentrically of said axis; and means for releasably securing said steering arm to the lower end of said strut with said axis of said mounting member coaxial with the axis of said strut whereby said mounting member can be securely clamped between said strut and said internal abutment in any one of a plurality of rotatably adjusted positions.

2. The device as defined by claim 1 wherein: said circular opening comprises a bore; said internal abutment forming means comprises a counter bore in the upper portion of said bore; and said portions of said mounting member comprises radial extensions on the upper portions thereof received in said counterbore.

3. The device as defined by claim 2 wherein: said radial extensions comprise a flange around said mounting member.

* * * * *